US007719823B2

(12) United States Patent
Josten et al.

(10) Patent No.: US 7,719,823 B2

(45) Date of Patent: May 18, 2010

(54) MODULAR INSULATION SYSTEM

(75) Inventors: Harry W. Josten, Grapevine, TX (US); Jason P. Wiant, Bedford, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 163 days.

(21) Appl. No.: 12/026,264

(22) Filed: Feb. 5, 2008

(65) Prior Publication Data

US 2008/0121406 A1 May 29, 2008

Related U.S. Application Data

(62) Division of application No. 11/007,665, filed on Dec. 8, 2004, now Pat. No. 7,329,813.

(51) Int. Cl.
*H02B 1/26* (2006.01)
*H01R 4/60* (2006.01)

(52) U.S. Cl. ....................... 361/611; 361/624; 361/637; 361/639; 361/648; 29/592.1; 29/426.1; 29/428; 174/68.2; 174/70 B; 174/88 B; 174/129 B; 312/223.1

(58) Field of Classification Search ................. 361/607, 361/609, 611, 614, 624, 637–639, 649, 648, 361/643, 675, 606, 652, 655, 656, 826, 829, 361/832; 174/67, 68, 68.2, 70 B, 71 B, 58, 174/99 B, 37, 63, 129 B, 171, 133 B, 138 F, 174/149 B, 72 B, 88 B, 68.3; 29/592.1, 426.1, 29/469, 521, 524, 428; 312/223.1; 439/212, 439/213

See application file for complete search history.

(56) References Cited

U.S. PATENT DOCUMENTS 2,542,853 A * 2/1951 Wills .......................... 361/608
3,066,244 A * 11/1962 Defandorf et al. ........... 174/560
3,140,426 A * 7/1964 Defandorf et al. ........... 200/293
3,148,312 A * 9/1964 Fouse ......................... 361/675
3,302,158 A * 1/1967 Hudson ...................... 439/265
3,321,672 A * 5/1967 Kuhn et al. ................. 361/610
3,469,149 A * 9/1969 Paape ......................... 361/624
3,514,671 A * 5/1970 Grams et al. ................ 361/622
3,553,534 A * 1/1971 Bould et al. ................ 361/614
3,628,098 A * 12/1971 Sturdivan .................... 361/611
3,924,161 A 12/1975 Olashaw, et al
4,024,441 A * 5/1977 Coyle et al. ................. 361/624
4,038,585 A * 7/1977 Wolski et al. ............... 361/624
4,178,624 A * 12/1979 Wilson et al. ............... 361/611

(Continued)

*Primary Examiner*—Michael V Datskovskiy
(74) *Attorney, Agent, or Firm*—Jose de la Rosa

(57) ABSTRACT

A method for isolating phases in an electrical equipment enclosure having multi-phase bus bars and a mounting base for mounting electrical equipment. The insulation system includes a plurality of components including a plurality of side isolation barriers with each barrier defining at least one slot proximate one edge of the barrier and having at least one tab along another edge of the barrier. A side barrier adapter is configured to engage the isolation barrier and to engage the mounting base. An inner isolation barrier is configured to isolate at least two of the vertical bus bars and couple to the mounting base. A vertical bus rear wall defining a plurality of slots proximate at least two edges of the cover is fastened to the inner isolation barrier. A plurality of corner connectors is configured to engage one of the cover slots and the side isolation barrier slots.

8 Claims, 8 Drawing Sheets

U.S. PATENT DOCUMENTS 4,180,846 A * 12/1979 Wilson et al. ............... 361/643
4,242,718 A * 12/1980 Shariff et al. ............... 361/611
4,360,857 A * 11/1982 Olashaw ..................... 361/648
4,374,405 A * 2/1983 Olashaw et al. ............. 361/639
4,916,574 A * 4/1990 Hancock et al. ............. 361/649
5,067,043 A * 11/1991 Markowski et al. ......... 361/650
5,113,312 A * 5/1992 Pratt et al. .................. 361/650
5,343,356 A 8/1994 Hancock
6,506,060 B2 1/2003 Sumida et al.

* cited by examiner 10
13
14
14
32
30
60
14
14
70
60
60
14
46
46
46
60
70
46
60
60
32
32
60
46
46
14
60
46
14
46
46
46
11
19
19
19
32
12

60
32
42
22
36
40
44
38
34
32
40
42
60

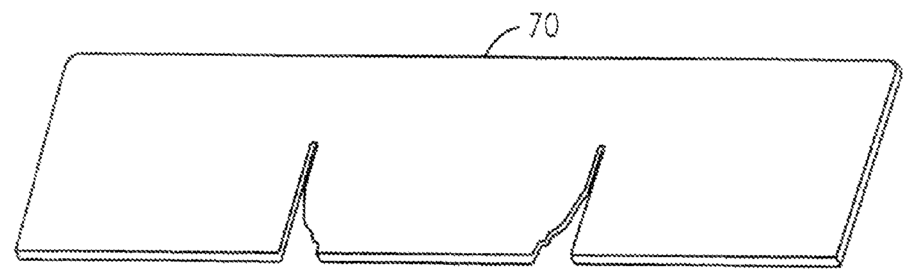
FIG. 9
FIG. 10a
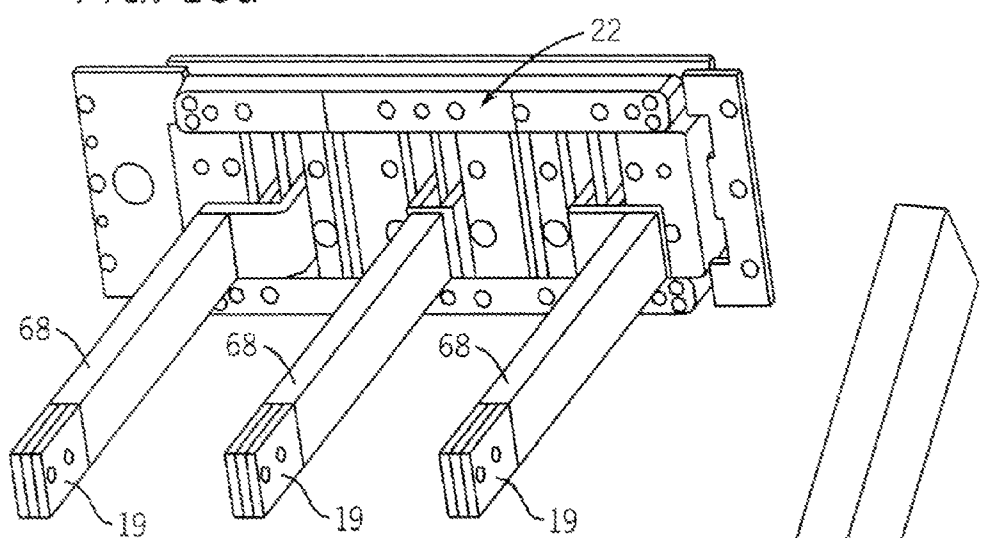
FIG. 10b 10
30
50
56
58
60
32
12
19
11
52
54

MODULAR INSULATION SYSTEM

CROSS-REFERENCE TO RELATED PATENT APPLICATIONS

This application is a Divisional of U.S. application Ser. No. 11/007,665, filed Dec. 8, 2004, incorporated herein by reference in its entirety.

FIELD

The present disclosure relates generally to the field of electrical switchboards and panel boards and more particularly to a modular insulation system for bus bars in switchboard and panel board enclosures.

BACKGROUND

Switchgear assemblies and switchboards and panel boards are general terms which cover metal enclosures, housing switching and interrupting devices such as fuses and circuit breakers, along with associated control, instrumentation and metering devices. Such assemblies typically include associated bus bars, interconnections and supporting structures used for the distribution of electrical power. Low voltage switchgear and switchboards operate at voltages of up to 600 volts and with continuous currents up to 5000 amps or higher. Such devices are also designed to withstand short circuit currents ranging up to 200,000 amps (3 phase RMS symmetrical).

Typical switchgear equipment is composed of a lineup of several metal and closed sections. Each section may have several circuit breakers stacked one above the other vertically in the front of the section with each breaker being enclosed in its own metal compartment. Each section has a vertical or section bus which supplies current to the breakers within the section by short horizontal branch busses, also referred to as run-in busses. The vertical bus bars in each section are supplied with current by a horizontal main bus bar that runs through the lineup of metal enclosed sections. The vertical bus bars may be configured as separate individual sections that require isolation from each other vertically as well as horizontally. A typical arrangement includes bus bars for each electrical phase of a multi-phase system which may include three power phases and a neutral.

In multi-phase systems, it is desirable to isolate the bus bars of each phase from each other and the other components in the enclosure. Isolation is beneficial to minimize hazards to personnel and to reduce arc fault hazards. Since configuration of switchboard enclosures and equipment vary from application and installation, a modular standard insulation system is easier to configure and install.

Thus there is a need for a modular insulation system for an electrical equipment enclosure having multi-phase vertical and horizontal bus bars. There is a further need to have an isolation system that can be easily configured, maintained, and installed without special tools and with a minimum of tools.

SUMMARY

There is provided a method for isolating phases in an electrical equipment enclosure having vertical bus bars and a mounting base for mounting electrical equipment. The method includes the steps of providing a plurality of side isolation barriers. A side barrier adapter is provided. Coupling the side barrier adapter to the mounting base and at least one side isolation barrier. An inner isolation barrier is provided. Coupling the inner isolation barrier to the mounting base to isolate at least two of the vertical bus bars from each other. A vertical bus rear wall is provided. A plurality of corner connectors are provided. Coupling the vertical bus rearwall and at least one side isolation barrier to at least one corner connector, wherein the vertical bus bars are individually isolated from each other. Another embodiment of the method of isolating phases includes the step of configuring the vertical bus rearwall with an opening for each runback bus bar. The methods may also include the step of providing an insulation shroud and coupling the insulation shroud to each runback bus bar.

There is further provided a modular insulation system kit for isolating phases in an electrical equipment enclosure with a modular insulation system. The enclosure includes a plurality of vertical bus bars and a mounting base for mounting electrical equipment. The kit includes a side barrier adaptor configured to couple to the mounting base and at least one side isolation barrier. An inner isolation barrier is configured to couple to the mounting base to isolate at least two of the vertical bus bars from each other. A vertical bus rear wall and at least one side isolation barrier are each configured to couple to at least one corner connector, wherein the vertical bus bars are individually isolated from each other.

There is further provided an electric equipment enclosure which includes a plurality of vertical bus bars coupled to the enclosure, with at least one vertical bus bar configured for each of an electrical phase. A horizontal bus bar is coupled to the at least one vertical bus bar for each electrical phase. A mounting base is coupled to the enclosure and configured to receive electrical equipment. A modular insulation system is configured to isolate the vertical bus bars of each electrical phase, The modular insulation system comprises a side barrier adapter coupled to the mounting base and at least one side isolation barrier. An inner isolation barrier is coupled to the mounting base and configured to isolate at least two vertical bus bars from each other. A vertical bus rear wall is coupled to at least one side isolation barrier with at last one corner connector, wherein the vertical bus bars are individually isolated from each other.

BRIEF DESCRIPTION OF THE DRAWINGS

FIG. 9 is a perspective view of an exemplary embodiment of a split bus barrier of a modular insulation system defining two slots configured to interlock with the inner isolation barrier of the modular insulation system.

FIG. 10*a* is a perspective view of an exemplary embodiment of a mounting base with multiple phase runback bus bars extending through orifices defined in the mounting base with the runback bus bars partially encased in an insulation shroud of a modular insulation system.

FIG. 10*b* is a perspective view of one of the insulation shrouds illustrated in FIG. 10*a*.

DETAILED DESCRIPTION OF EXEMPLARY EMBODIMENTS

Before describing the exemplary embodiments of a modular insulation system for electrical equipment in an electrical equipment enclosure, for example, an electrical equipment enclosure, several comments are appropriate. Switchgear assemblies and panel board assemblies typically include vertical (section) bus bars to distribute electrical power within the enclosures. In a short circuit condition, extreme magnetic forces are created in the bus bars as a result of short circuit currents up to and including 200,000 amps symmetrical RMS flowing through each bus bar. In a three phase power system (typically) as a short circuit current flows through such bus bars, magnetic forces between adjacent bus bars tend to move such bus bars laterally (perpendicular) to the current flow. Such movement of the bus bars is typically prohibited or inhibited to avoid damage in arcing within an electrical equipment enclosures by bus bar brace apparatus and equipment arrangements within an electrical equipment cabinet. However, it is still expedient to provide isolation of the bus bars in each phase to further minimize arc flash and potential short circuit conditions. The modular insulation system that will isolate the bus bars from each other (and allow the enclosure designer or the maintenance of the enclosure) easier to configure and also easier to manufacture since standard components can be prepared and used for a variety of installation configurations. A modular insulation system kit including the several components described herein may also be provided in the field.

An additional advantage to use of the modular insulation system to isolate the bus bars within the several phases of the electrical equipment enclosure is the isolated phase vertical bus bars exhibit improved convection cooling which increases their continuous current capability. The bus bars can still be braced for short circuit conditions with the bus base brace apparatus without blocking air flow around or between the bus bar members. This “chimney effect” is also facilitated if the bus bars have a C-channel shape. Also, if two C-channel shape bus bars are aligned with their short sidewalls of each C-shaped bus bar facing each other, a spaced apart rectangular tube is formed which further facilitates air movement and thus cooling of the bus bar system. An example of such C-channel shaped bus bar is disclosed in U.S. patent application entitled ELECTRIC BUS BAR filed Dec. 8, 2004 (Ser. No. 11/007,664, now abandoned) and assigned to the assignee of the present application.

Figure 1:
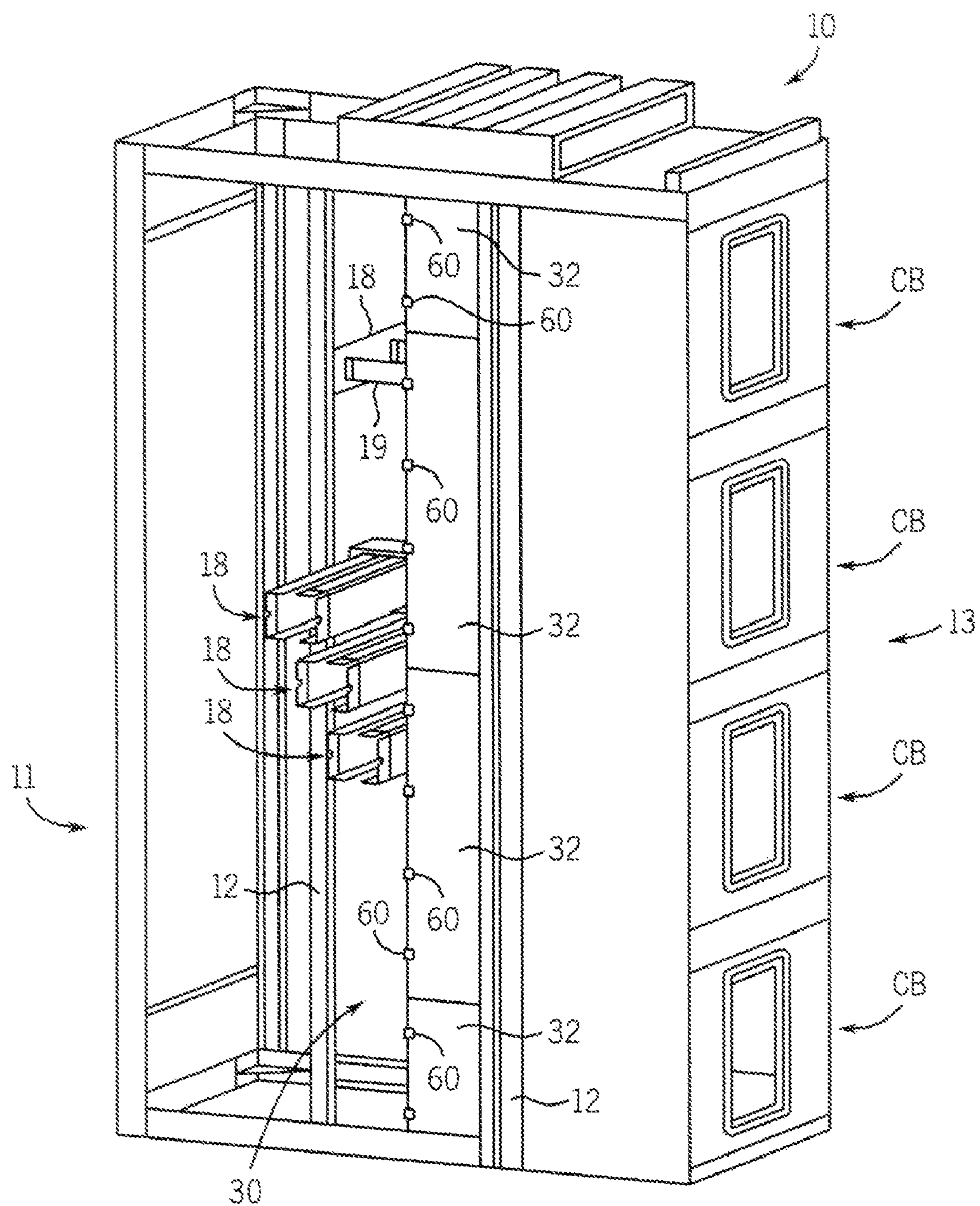
FIG. 1 is a perspective view of an electrical equipment enclosure including compartments for electrical equipment, such as circuit breakers and including an exemplary embodiment of a modular insulation system.

Referring now to the figures, FIG. 1 is an illustration of exemplary embodiment of an electrical equipment enclosure 10, without several of the outer panels for clarity purposes. FIG. 1 also illustrates electrical equipment compartments for circuit breakers in the illustrated drawing mounted in the front of an electrical equipment cabinet 10. A mounting base, 22 (not shown in FIG. 1) forms the rear wall of the equipment compartment CB and is coupled to several of the frame members 12 of an electrical equipment enclosure 10.

FIG. 1 specifically depicts a multi-phase switchgear assembly conventionally having three power phases, A B and C. A neutral bus or grounding bus can also be provided. In the illustration of FIG. 1, horizontal bus bars 18 feed the main electrical power to the enclosure 10 and to adjacent enclosures (not shown) in a typical installation.

Figure 2:
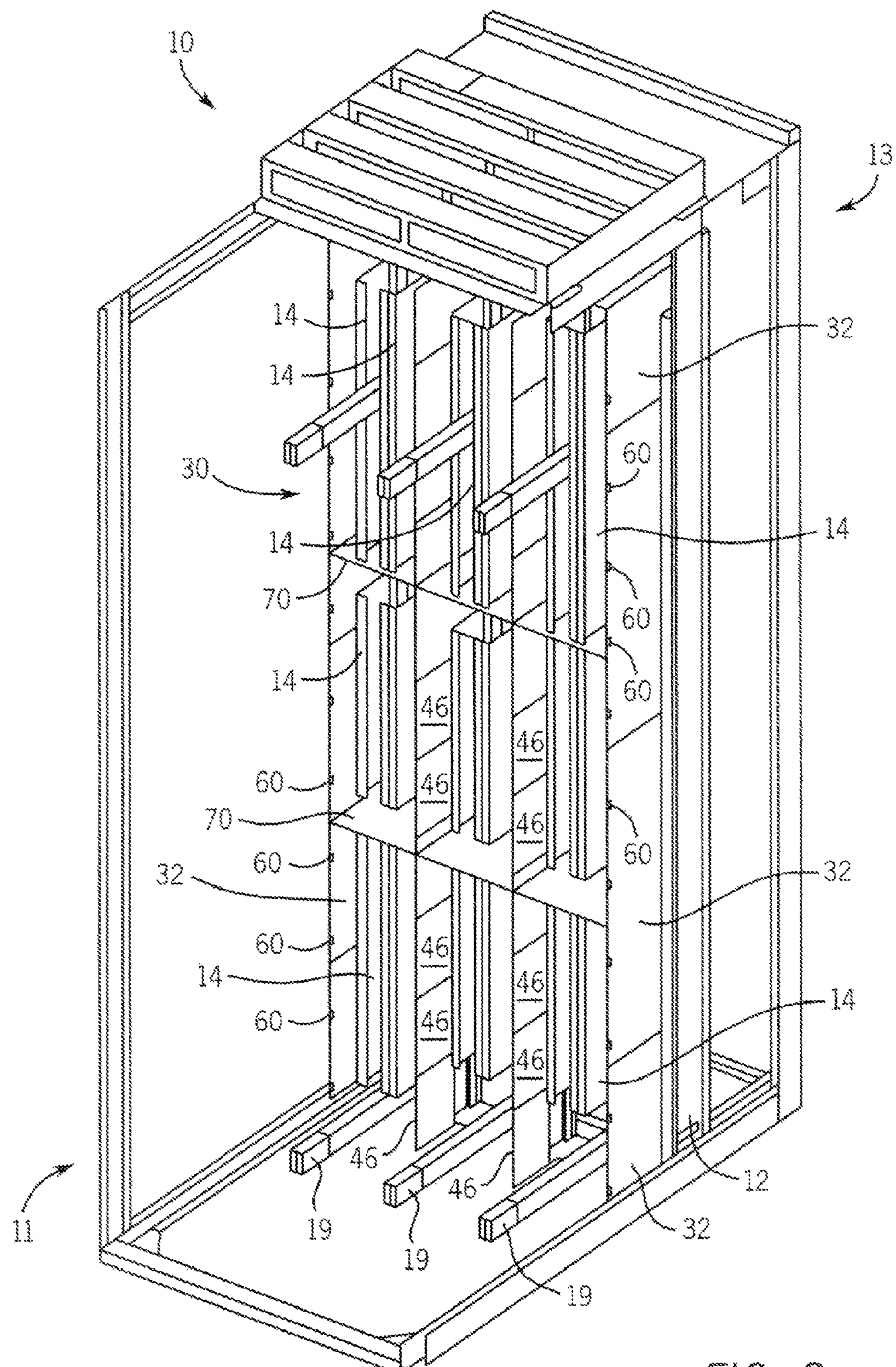
FIG. 2 is a perspective view of an electrical equipment enclosure from the rear aspect, including an exemplary embodiment of a multiple phase, vertical bus bars, with each vertical bus bar having three sections separated by a split bus barrier.
Figure 3:
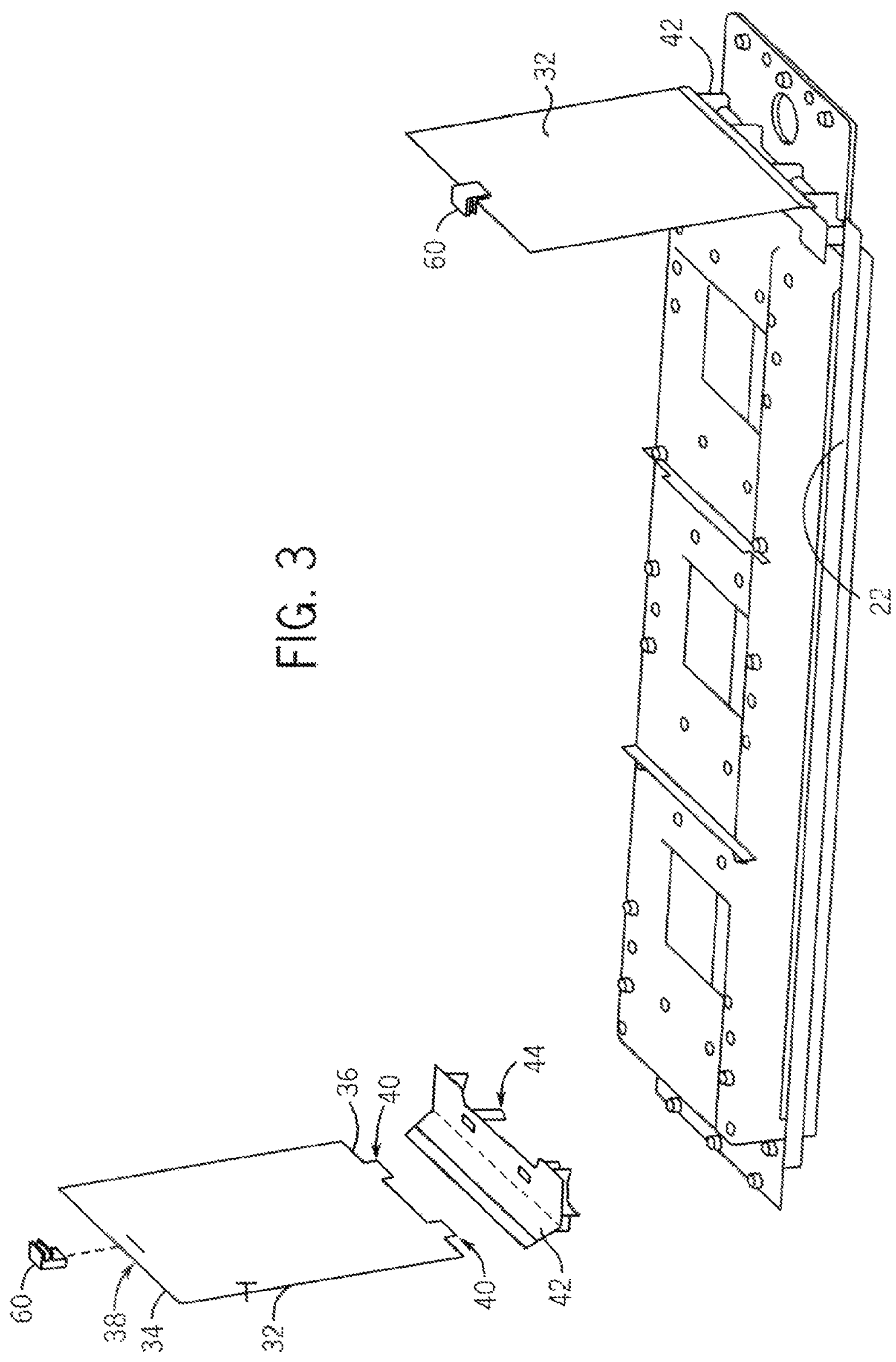
FIG. 3 is an exemplary embodiment of a mounting base for electrical equipment including a side barrier adapter and side isolation barrier of a modular insulation system on each of the two ends of the mounting base.

FIG. 2 illustrates vertical bus bars 14 extended typically throughout the height of an electrical equipment enclosure 10 with horizontal bus bars 18 selectively positioned and connected mechanically and electrically to the vertical bus bars 14 for the distribution of power within the system. Spaced apart frame members 12 are mounted within an electrical equipment enclosure 10 at predetermined positions to support electrical equipment such as circuit breakers mounted in the enclosure 10. The equipment can be accessed from either the front side 13 or the back side 11 of the enclosure 10. An example of a typical electrical equipment that is mounted in an electrical equipment enclosure 10 is a circuit breaker CB. A circuit breaker mechanism is typically contained within a housing. The housing is coupled to a mounting base 22 which supports the circuit breaker housing and provides an apparatus for coupling the circuit breaker to the various bus bars within an electrical equipment enclosure 10. A mounting plate system is used to attach the base member 22 to the frame members 12 of an electrical equipment enclosure 10.

FIGS. 3-11 illustrate an exemplary embodiment of a modular insulation system for electrical equipment in an electrical equipment enclosure 10.

Side isolation barriers 32 are configured in a planar arrangement having at least one edge 34 and another edge 36 used for attaching the side isolation barrier 32 to other components of the insulation system 30. At least one slot 38 proximate one edge 34 of the barrier is defined in the side isolation barrier 32 and having at least one tab 40 defined along another edge 36 of the barrier 32.

The side isolation barrier 32 is coupled to the mounting base 22 with a side barrier adapter 42. (See FIGS. 3, 5 and 6.) The side barrier adapter 42 is configured with at least one snap lug 44 and also defines adapter slots 43 in each of the walls forming the side barrier adapter 42. The snap lugs 44 engage slots defined in the mounting base 22 and the tabs 40 formed on the side isolation barriers 32 engage the adapter slots 43 in the side barrier adapter 42. A typical arrangement is to have a side barrier adapter 42 and side isolation barrier 32 coupled to two sides (typically the narrower side) of the mounting base 22. As illustrated in FIGS. 1 and 2, several side mounting barriers 32 are arranged vertically to isolate the vertical bus bars 14 in the enclosure. The side isolation barrier 32 can be fabricated from a flat sheet of insulating material and cut to size as is necessary to fit within an electrical enclosure 10.

Figure 4:
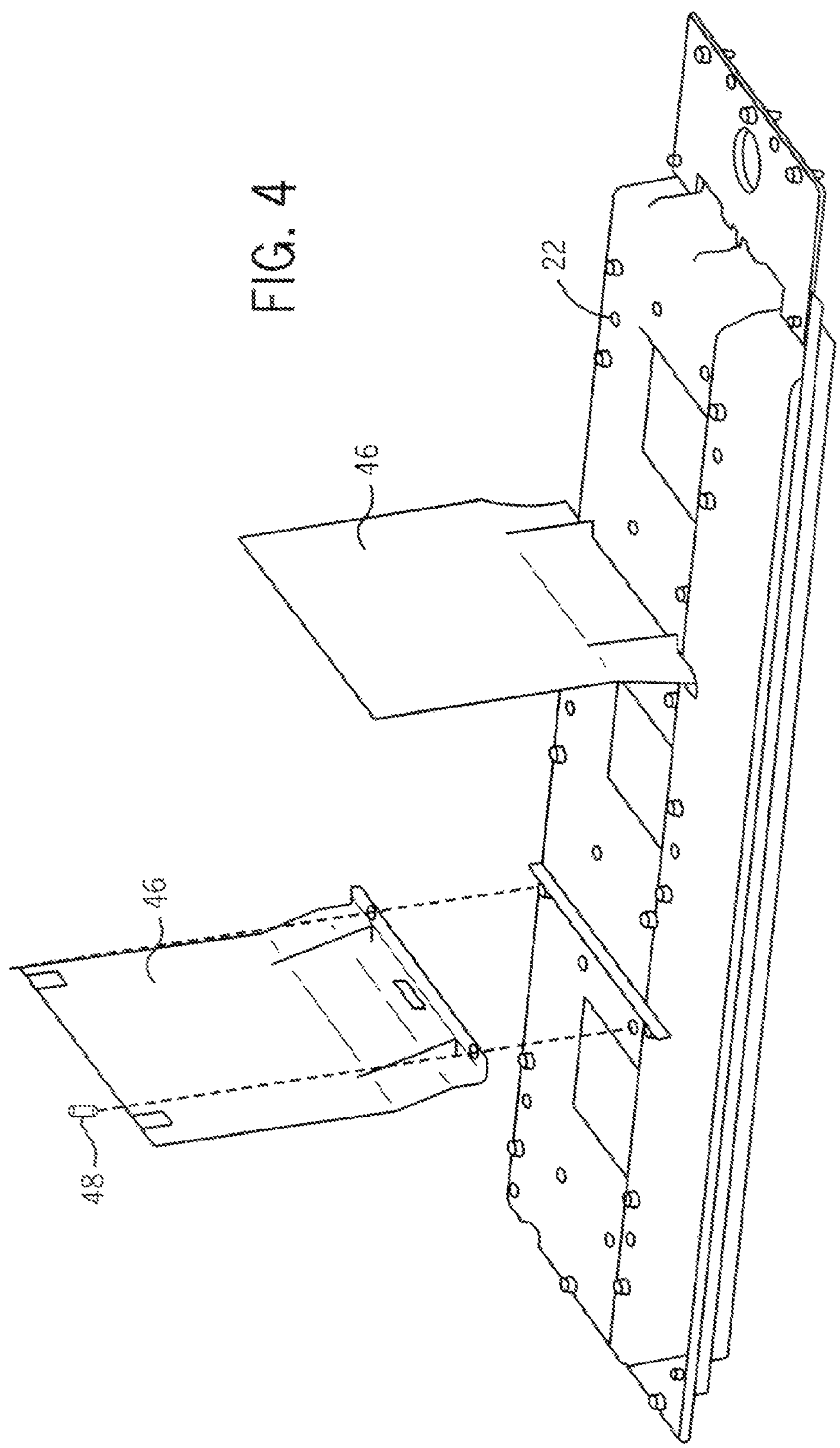
FIG. 4 is an exemplary embodiment of a mounting base for electrical equipment and including two inner isolation barriers of a modular insulation system configured to isolate bus bars in adjacent electrical phases.
Figure 5:
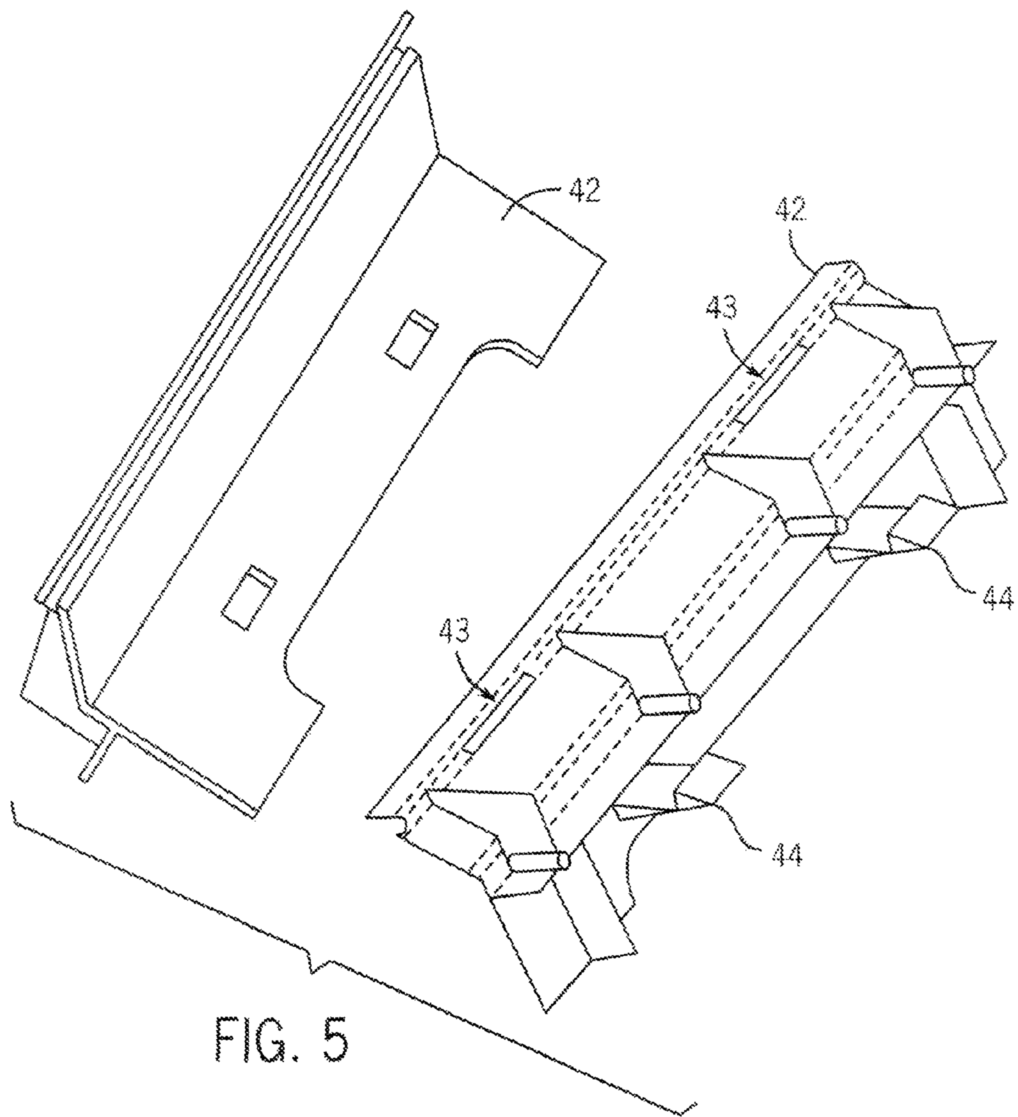
FIG. 5 illustrates two views of an exemplary embodiment of a side barrier adapter for a modular insulation system.
Figure 6:
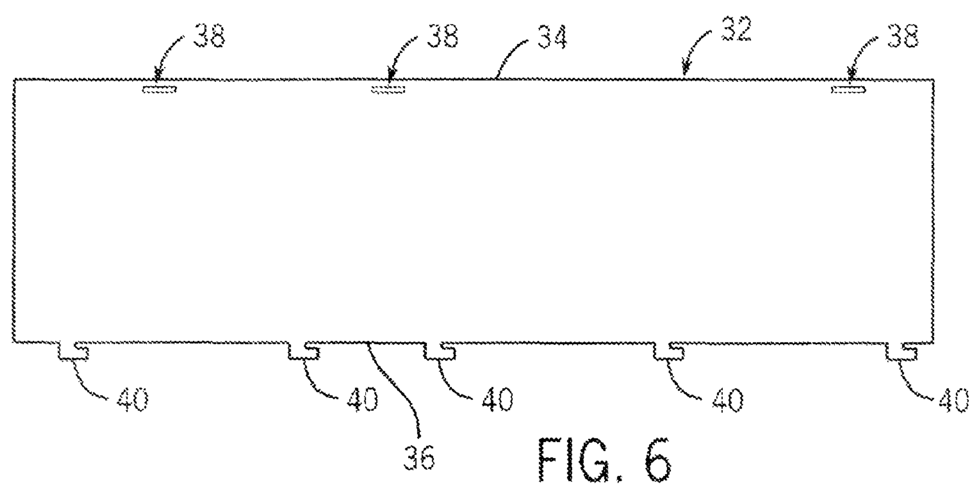
FIG. 6 is a plan view of an exemplary embodiment of a side isolation barrier of a modular insulation system.
Figure 7:
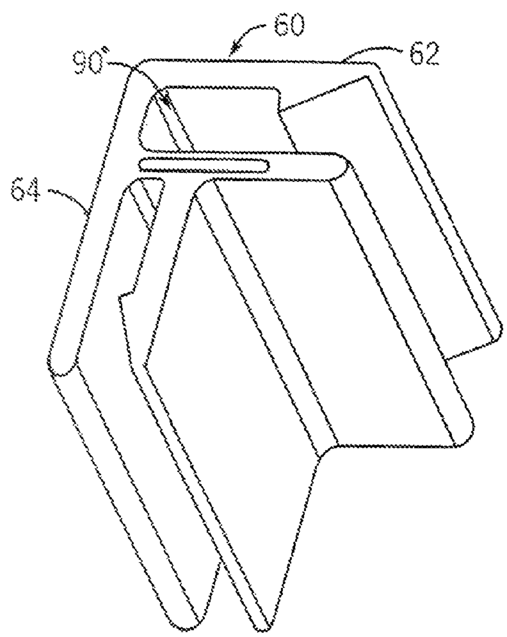
FIG. 7 is a perspective view of an exemplary embodiment of a corner connector of a modular insulation system.
Figure 8:
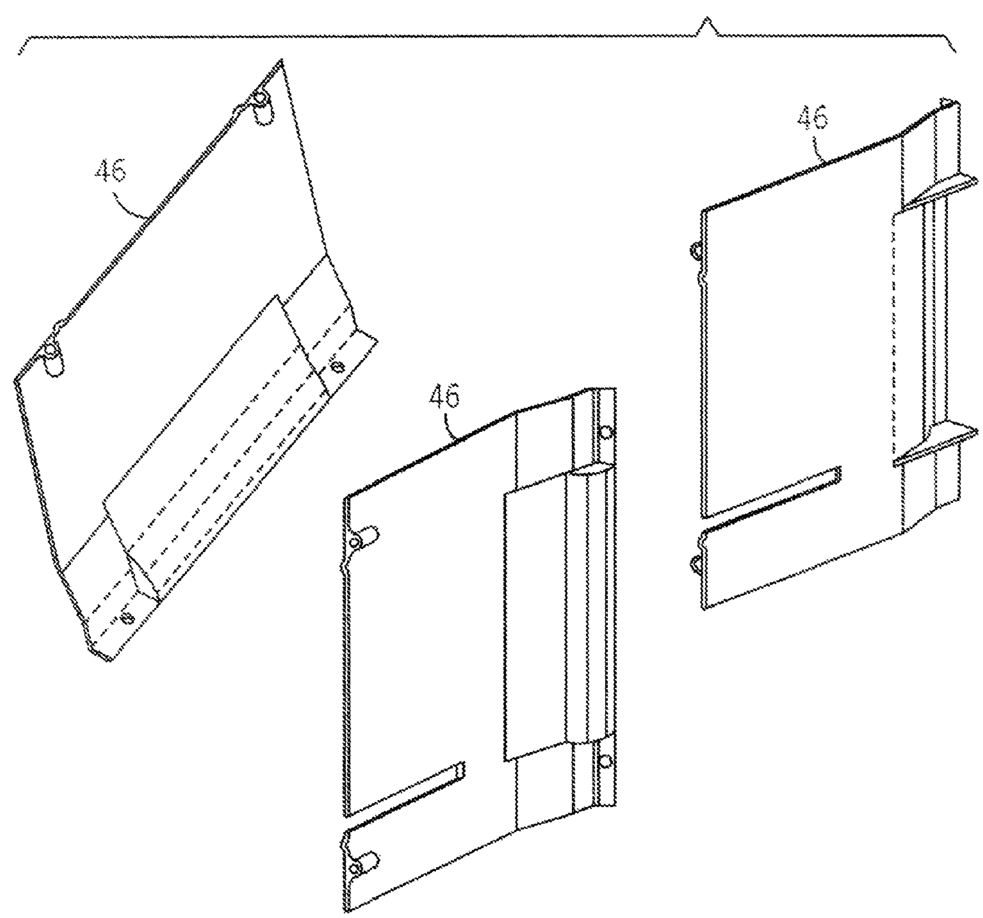
FIG. 8 illustrates several views of an exemplary embodiment of an inner isolation barrier of a modular insulation system.

FIGS. 4 and 8 illustrate inner isolation barriers 46 configured to isolate at least two of the vertical bus bars 14 and coupled to the mounting base 22. The inner isolation barrier 46 is secured to the mounting base 22 by a fastener such as a screw or a bolt or a rivet. In FIG. 4, two inner isolation barriers 46 are shown with the mounting base 22. FIG. 8 illustrates several views of an inner isolation barrier 46 to show different configurations, for example, one inner isolation barrier 46 is not configured with slots whereas another inner isolation barrier 46 includes a slot to facilitate the mounting of a split bus barrier 70. FIG. 2 illustrates a plurality of inner isolation barriers 46 mounted between the phases of the multiple phase vertical bus bars 14 in an electrical equipment enclosure 10.

Figure 11:
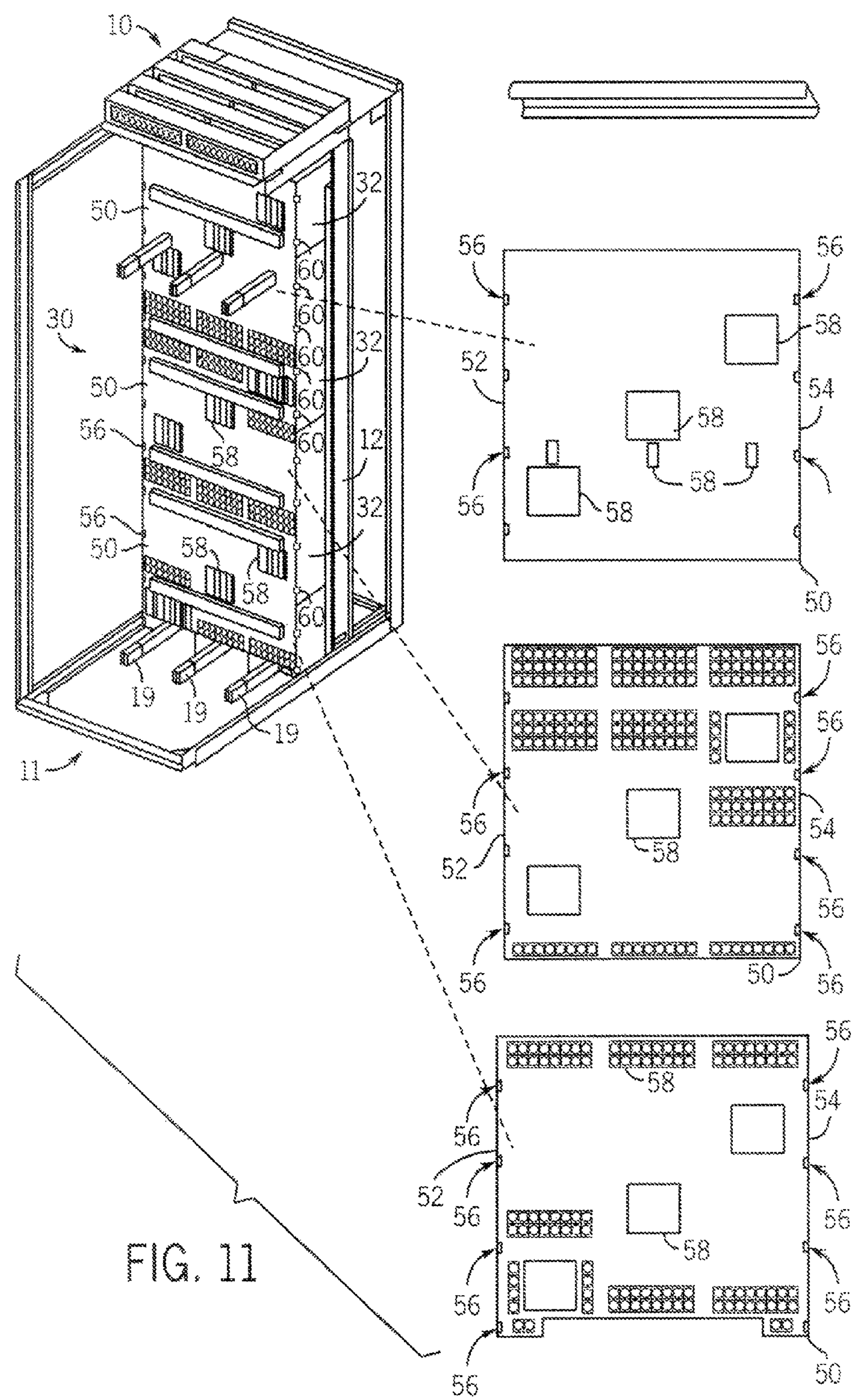
FIG. 11 is a perspective view of an exemplary embodiment of an electrical equipment enclosure including a modular insulation system isolating the vertical bus bars from each other and illustrating several exemplary embodiments of a vertical bus rearwall having differently configured openings for bus bars, bus braces and ventilation arrangements

To complete the enclosure of the vertical bus bars 14, in the enclosure 10, the vertical bus rearwall 50 is configured to extend across the width of the enclosure and couple to the side isolation barriers 32 as illustrated in FIG. 11. A plurality of corner connectors 60 are provided to couple the vertical bus rearwall 50 with the side isolation barriers 32. The corner connectors are configured with two walls 62, 64 and that are aligned at a 90° angle with each wall and configured to engage one of the cover slots 56 and the side isolation barrier slots 38. (See FIG. 7 which is a perspective view of a corner slot 60.) The vertical bus rearwall 50 defines a plurality of slots 56 approximate at least two edges 52, 54 of the cover 50. The vertical bus rearwall 50 is also fastened to the inner isolation barrier 46 with fasteners such as screws or the like.

The vertical bus rearwall 50 can be configured with a variety of openings 58 to accommodate various bus bar, bus brace and ventilation arrangements. FIG. 11 illustrates three exemplary embodiments of a vertical bus rearwall 50 having various ventilating openings and bus bar openings. Connecting bus bars (not shown) extend through such openings 58 in the vertical bus rearwall 50 and couple the vertical bus bars 14 (See FIG. 2) to selective horizontal bus bars 18 (See FIG. 1).

The runback bus bars 19 typically extend through the mounting base 22 and couple the circuit breaker disconnects (not shown) to, for example, the cable terminals (not shown). FIG. 10*a* illustrates a typical arrangement of three runback bus bars 19 (one for each phase) extending through a mounting base 22. The runback bus bars 19 include an insulation shroud 68 which is a component of the modular insulation system 30. FIG. 10*b* illustrates an exemplary embodiment of an isolation shroud 68 for use with a runback bus bar 19.

In some installations, the vertical bus bars 14 are separated vertically. The separate sections of the vertical bus bars 14 also require isolation between the vertical sections of the vertical bus bar 14. (Such vertical bus sections are referred to as a split bus bar.) FIG. 9 illustrates an exemplary embodiment of a split bus barrier 70 which isolates at least two sections of the vertical bus bar 14. FIG. 2 includes two split bus barriers 70 mounted between sections of the vertical bus bar 14 in each phase of the electrical distribution system within the enclosure 10.

The side isolation barrier 32, side barrier adapter 42, inner isolation barrier 46, vertical bus rearwall and the corner connectors 60 can be composed of a thermoplastic material. In some installations, the components can be composed of a thermal plastic that is a clear polycarbonate to allow viewing of the vertical bus bars 14 and inter connections. The vertical bus rearwalls 50 and the side isolation barriers 32 can also be fabricated from glass reinforced polyester sheet material, for example, GPO-2.

With the several modular insulation system 30 components installed, the vertical bus bars 14 are isolated both phase-to-phase and phase-to-ground. The back side of the mounting base 22 forms the front wall of the vertical bus compartment. The side isolation barriers 32 and the side barrier adapters coupled to the mounting base 22 form the outside sidewalls of the vertical bus compartment. The vertical bus rearwall 50 creates the rear wall and the inner isolation barriers 46 provide the internal phase isolation. Each phase, of the vertical bus 14, is thereby enclosed in a separate, insulated vertical enclosure that creates an unobstructed vertical air duct or chimney to provide convection cooling for the vertical bus 14. In the configurations where the vertical bus 14 is divided into two or more sections, a split bus barrier 70 is installed. In such case, the vertical bus rear wall 50 provides orifices 58 for ventilation to allow air to enter and exit above and below the split bus barrier 70 to preserve the chimney effect. In some installations, a vertical brace insulation covers 71 can be provided, as illustrated in FIG. 11.

One advantage of the modular insulation system 30 is that the only tool required to assemble or disassemble selected modular insulation system components is a screwdriver. Another advantage of the modular insulation system 30 is that repairs and maintenance of the various components can be accomplished from the rear side of the enclosure 10 without disassembling other components within the enclosure 10.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature Thus, there is provided a modular system to insulate and isolate phase to phase vertical bus bars in an electrical equipment enclosure. The foregoing description of embodiments have been presented for purposes of illustration and description. It is not intended to be exhaustive nor to be limited to the precise forms disclosed and modifications and variations are possible in light of the above teachings or may be acquired by practice of the invention. The embodiments are chosen and described in order to explain the principles and practical application to enable one skilled in the art to utilize the modular insulation system in various embodiments and with various modifications that are suited to the particular use contemplated. It is intended that the scope of the modular insulation system be defined by the claims appended hereto and their equivalents.

What is claimed is:

1. A method for isolating phases in an electrical equipment enclosure having vertical bus bars and a mounting base for mounting electrical equipment, the method comprising the steps of:

providing a plurality of side isolation barriers;

providing a side barrier adaptor;

coupling the side barrier adaptor to the mounting base and at least one side isolation barrier;

providing an inner isolation barrier, coupling the inner isolation barrier to the mounting base to isolate at least two of the vertical bus bars from each other;

providing a vertical bus rear wall, providing a plurality of corner connectors; and coupling the vertical bus rear wall and at least one side isolation barrier to at least one corner connector, wherein the vertical bus bars are individually isolated from each other.

2. The method of claim 1, including the step of configuring the vertical bus rear wall with an opening for a runback bus bar.

3. The method of claim 2, including the steps of providing insulation shrouds and coupling the insulation shrouds to the runback bus bars.

4. The method of claim 1, including the step of installing a split bus barrier between sections of the vertical bus bar.

5. The method of claim 1, wherein the side isolation barrier, side barrier adaptor, inner isolation barrier, vertical bus rear wall, and corner connectors are composed of one of thermoplastic and thermoset material.

6. The method of claim 5, wherein the thermoplastic is a clear polycarbonate.

7. The method of claim 4, wherein the split bus barrier is composed of one of thermoplastic and thermoset material.

8. The method of claim 1, including the step of only using a screw driver to assemble and disassemble selective modular insulation system components.

* * * * *